R. DRAMBOURG.
STORAGE BATTERY PLATE.
APPLICATION FILED SEPT. 25, 1916.
1,403,394.
Patented Jan. 10, 1922.
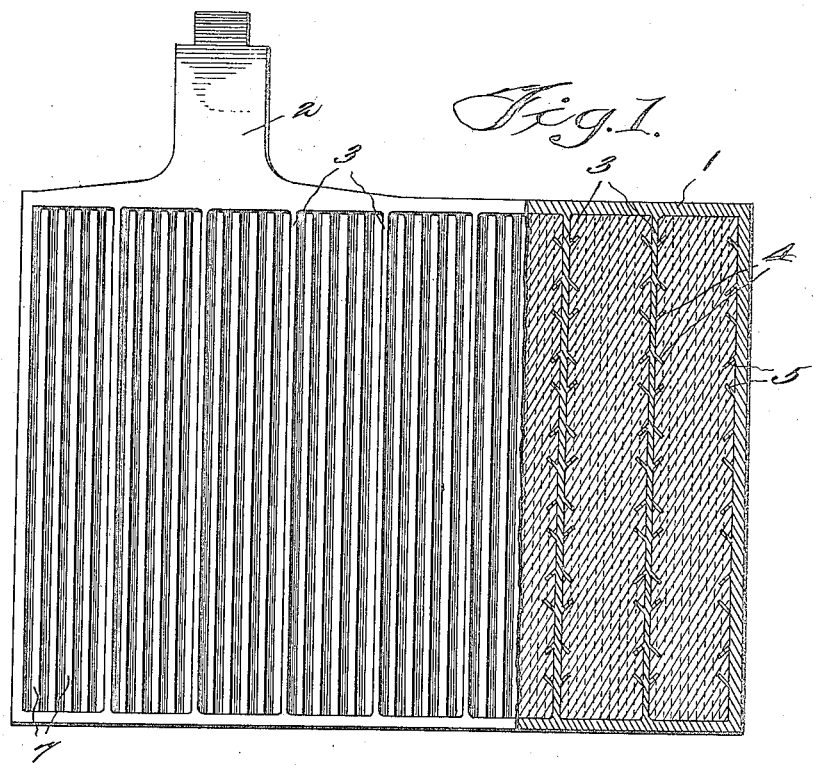
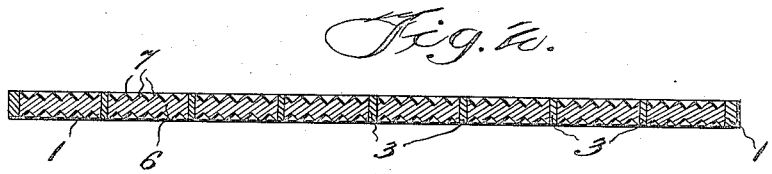
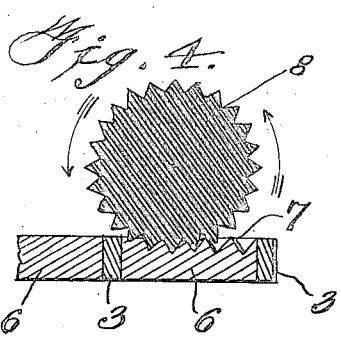
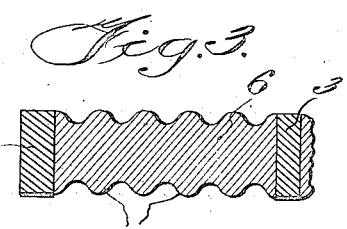
WITNESSES
INVENTOR
Rudolphe Drambourg,
BY
ATTORNEY

UNITED STATES PATENT OFFICE.

RUDOLPHE DRAMBOURG, OF BROOKLYN, NEW YORK, ASSIGNOR, BY MESNE ASSIGN-MENTS, TO FEDERAL BATTERY MANUFACTURING CORPORATION, OF WASHINGTON, DISTRICT OF COLUMBIA, A CORPORATION OF DELAWARE.

STORAGE-BATTERY PLATE.

1,403,394.     Specification of Letters Patent.     Patented Jan. 10, 1922.

Application filed September 25, 1916. Serial No. 122,079.

*To all whom it may concern:*

Be it known that I, RUDOLPHE DRAMBOURG, a citizen of the United States, residing at 969 Kent avenue, New York city, (Brooklyn,) in the county of Kings and State of New York, have invented certain new and useful Improvements in Storage - Battery Plates, of which the following is a specification.

This invention relates broadly to electro-chemistry, and has more especial reference to an active plate for storage or secondary batteries.

More particularly, the invention has reference to the provision of a plate of the character mentioned, which will present a greatly increased area to the electrolyte, thus enhancing the capacity of the plate.

The nature of the invention, more explicitly set forth, resides in the construction or formation of the plate, the active material as carried thereby, having the opposite surfaces thereof corrugated, consequently, affording an area greater than that to be had in the conventional flat plate.

The invention also aims to provide a novelly constructed plate, so formed as to prevent the buckling thereof, and one wherein the paste or other active material used, will be securely held by the plate, the construction thereof embodying, a plurality of spurred ribs about which the material is compressed.

The invention also embraces a novel method whereby the exposed surfaces of the active material are corrugated, providing a simple, inexpensive and efficient means.

The annexed drawings and the following description set forth in detail certain construction embodying the invention, such disclosed means constituting, however, but one of the various mechanical forms in which the principle of the invention may be used.

In said annexed drawings:

Figure 1 is a side elevation of my improved battery plate showing the same principally in section, Figure 2 is a longitudinal section therethrough, Figure 3 is a fragmentary cross-section in detail showing a modified form of the plate, and Figure 4 is a detail view illustrating one method of corrugating the active material of the plate.

Referring more particularly to the drawings, wherein like reference numerals refer to corresponding parts throughout the views, I provide in lieu of the usual grid, a battery plate 1, the body of which is in the form of an open rectangular or other shaped frame. The plate 1 carries an upstanding integral lug 2, which affords means whereby connection may be had with one of the battery terminals. A plurality of vertically or otherwise disposed ribs, generally indicated by the numeral 3, are carried by the body portion 1 of the plate and have arranged thereon, a plurality of angularly extending retaining spurs or teeth 4, the purpose of which will be subsequently described. A second set of these retaining spurs are formed upon the adjacent faces of the side portions of the frame, and are designated in general by the numeral 5. It is to be noted, that these retaining spurs 4 and 5 are disposed in opposite relation, that is, they extend in opposite directions from each other.

An active material, 6, such as red lead, litharge or the like, of pasty consistency is pressed into the openings of the plate or grid, about the ribs 3, the surface of the plate then being carefully smoothed to remove any waste. With the soft active material thus arranged upon the plate, the device in a whole is submitted to the action of a corrugated roller which is passed thereover, consequently causing the exposed surfaces of the active material to be corrugated in turn, as at 7, thus providing a series of pyramidically shaped faces. By so doing, it will be evident that the active surfaces of the plate will be greatly increased in area, hence, adding greatly to the capacity of the same.

Instead of corrugating the exposed active surfaces of the plate by means of the roller, as above described, I may use in lieu thereof, several corrugated plates. Between the corrugated faces of these plates, the battery plate is inserted. The plates are then moved toward each other and, with sufficient pressure applied thereto, will corrugate the active surfaces of the battery plate, in the desired manner.

It will be evident, that when the active material has become sufficiently hard, dislodgment of the same from the body portion of the battery plate will be absolutely prevented by means of the retaining ribs 3, which have arranged upon their opposite faces, the anchoring or retaining spurs 4 and 5. It is also obvious, that buckling or walking of the plate will be prevented, this being due to the arrangement of the retaining ribs and their positive engagement with the active material.

In Figure 3, I have disclosed a modified form, wherein the exposed surfaces of the active material 6 are corrugated in a manner similar to that as described in conjunction with the preferred embodiment of the invention, but as will be noted, the corrugations are rounded instead of right-angled. By this construction, liability of the flaking of the active material, at the outermost exposed points, is eliminated.

I desire to have it understood that various arrangements of the active surfaces of the plate may be had, instead of those as above described, the corrugated surface being either round, right-angled, acute or obtuse, or zig-zagged, whereby to increase the area surface of any dimensioned pasted plate.

Other modes applying the principle of my invention may be employed instead of the one explained, change being made as regards the construction herein disclosed, provided the means stated by any of the following claims or the equivalent of such stated means be employed.

In Figure 4, a method of corrugation is shown, by way of illustration, wherein a corrugated roller 8 operated by hand, power or otherwise is indicated moving over a plate, the active material of which has been applied and is soft. Furthermore, in corrugating the active material, the latter is compressed and therefore there is no reduction in the amount of active material in the plate, so that the life of the plate is not shortened. The corrugating rollers or plates constituting preferred forms of corrugating mediums, are preferably of soft rubber or the like so that a better conformation is produced between the medium and the pasty active material.

I therefore claim as my invention:—

1. A battery plate of the pasted type including a grid, and active material on said grid, said active material having its opposite faces corrugated to provide ribs the exposed margins of which are straight uninterruptedly from one side of the grid to the other for increasing the effective area of the active material.

2. A method of increasing the area of the exposed surface of active material on battery electrodes consisting in subjecting the material to the action of an inherently yieldable ridging medium.

3. A method of making a battery electrode of the pasted type consisting in submitting the applied paste while soft to the action of an inherently yieldable medium having other than a smooth surface, whereby the exposed surface of said paste is increased through the imprint of said medium.

4. A method of corrugating pasty active material applied to a storage battery grid, consisting in subjecting the same to the pressure of a soft rubber or like corrugating medium.

In testimony whereof I affix my signature in presence of two witnesses.

RUDOLPHE DRAMBOURG.

Witnesses:
 LOUIS A. FREEDMAN,
 JOHN E. BUSCH.